US006045303A

United States Patent [19]
Chung

[11] Patent Number: 6,045,303
[45] Date of Patent: Apr. 4, 2000

[54] ROTATABLE TORQUE ADJUSTING DEVICE OF ROTATION TOOL

[76] Inventor: Lee Hsin-Chih Chung, ShangSanTsoWu No. 21-8, Wu-Chun Li, Chung-Li City, Taiwan

[21] Appl. No.: 09/203,576

[22] Filed: Dec. 2, 1998

[51] Int. Cl.$^7$ .......... B23B 45/00

[52] U.S. Cl. .......... 408/124; 408/139; 192/56.57; 192/56.62; 192/69.5

[58] Field of Search .......... 192/56.57, 56.62, 192/69.5; 408/9, 139, 129, 140

[56] References Cited

U.S. PATENT DOCUMENTS

| | | | |
|---|---|---|---|
| 3,787,136 | 1/1974 | Steiner | 408/139 |
| 3,956,905 | 5/1976 | Thackston | 192/56 C |
| 4,322,186 | 3/1982 | Boling | 408/139 |
| 4,386,689 | 6/1983 | Kato | 192/56 R |
| 4,483,429 | 11/1984 | Tiedeman | 192/18 R |
| 4,861,201 | 8/1989 | Cuilleron | 408/142 |
| 5,167,309 | 12/1992 | Albert et al. | 192/0.034 |
| 5,277,527 | 1/1994 | Yokota et al. | 408/139 |
| 5,356,350 | 10/1994 | Schreiber | 475/153 |
| 5,437,524 | 8/1995 | Huang | 408/139 |
| 5,482,413 | 1/1996 | Argaud | 408/239 R |
| 5,738,469 | 4/1998 | Hsu | 192/150 |
| 5,868,231 | 2/1999 | Kampf | 192/56.5 |

FOREIGN PATENT DOCUMENTS

| | | | |
|---|---|---|---|
| 1073009 | 2/1984 | Sweden | 408/139 |

*Primary Examiner*—Daniel W. Howell
*Attorney, Agent, or Firm*—Browdy and Neimark

[57] ABSTRACT

A rotatable torque adjusting device which is incorporated in a rotation tool for adjusting output torque of the rotation tool is disclosed. The rotation tool has a front end surface on which a support cylinder is provided to rotatably support an output shaft which provides the output torque. Cavities are provided on the front end surface and surround the support cylinder to each receive a spherical member which applies a force to a rotating disk inside the rotation tool to adjust the output torque. The torque adjusting device includes a cam ring rotatably fit over the support cylinder, having a plurality of circumferentially-extending arc-shaped camming projections, each defining a cam. A follower ring non-rotatably fit over the support cylinder, having camming projections, each defining a follower engageable with the respective cam of the cam ring which converts a relative rotation therebetween into an axial movement of the cam ring. A biasing device is arranged between the cam ring and the spherical members for applying a force to the spherical member caused by the axial movement of the cam ring. A cap is fit over the cam ring, the follower ring and the biasing means in such a way to rotatably couple to the cam ring and axially movably fix the follower ring so that by manually rotating the cap, a relative rotation is caused between the cam ring and the follower ring which in turn axially moves the cam ring to apply the force to the spherical members.

5 Claims, 5 Drawing Sheets

ROTATABLE TORQUE ADJUSTING DEVICE OF ROTATION TOOL

FIELD OF THE INVENTION

The present invention relates generally to a rotatable torque adjusting device of a rotation tool, such as an electrical hand drill, and in particular to a rotatable torque adjusting device which is capable to make a full turn so that the adjustment of torque setting may be done in cyclic manner by continuously rotating the adjusting device in the same direction and no reverse rotation of the adjusting device is needed.

BACKGROUND OF THE INVENTION

Most of the electrical rotation tools, such as electrical hand drill, are provided with a torque adjusting device to allow the user of the tools to adjust the output torque provided by the rotation tool. Indications may be provided to indicate the torque set by the adjusting device. Conventionally, the torque adjusting device is made rotatable about the axis of the rotatable output shaft of the rotation tool. However, the operation of the adjusting device in the conventional designs is non-cyclic and it is in general only allowed to move in a predetermined direction to, for example, increase the output torque by clockwise rotation of the adjusting device while counterclockwise rotation reduces the torque output. In other word, once a user wishes to increase the torque output, he or she has to rotate the adjusting device in the clockwise direction and if he or she needs to lower the torque output, then he or she has to rotate the adjusting device in the counterclockwise direction. This, to some extent, is inconvenient to the general users.

Thus it is desirable to have a torque adjusting device adapted to be incorporated in a rotation tool, the adjusting device being capable of full-turn, cyclic rotation for setting the torque output in a cyclic direction and further capable to operate in a bidirectional fashion so as to overcome the problems encountered in the conventional designs.

OBJECTS OF THE INVENTION

Therefore, an object of the present invention is to provide a torque adjusting device adapted to be incorporated in a rotation tool for setting/adjusting torque output of the rotation tool wherein the torque adjusting device is capable of full-turn, cyclic rotation so as to allow the output torque of the rotation device to be set/adjusted in a cyclic manner.

Another object of the present invention is to provide a torque adjusting device adapted to be incorporated in a rotation tool for setting/adjusting torque output of the rotation tool, wherein the adjusting device is capable of rotation in either clockwise or counterclockwise direction to for example increase the torque output.

SUMMARY OF THE INVENTION

To achieve the above objects, in accordance with the present invention, there is provided a torque adjusting device adapted to be incorporated in a rotation tool for setting/adjusting torque output of the rotation tool, wherein the rotation tool comprises a front end surface on which a support cylinder is provided to rotatably support an output shaft which provides the output torque and a plurality of cavities provided on the front end surface and surrounding the support cylinder to each receive a spherical member which applies a force to a rotating disk inside the rotation tool to adjust the output torque, the torque adjusting device comprising a cam ring rotatably fit over the support cylinder and having a plurality of circumferentially-extending arc-shaped camming projections, each defining a cam and a follower ring non-rotatably fit over the support cylinder and having camming. projections, each defining a follower engageable with the respective cam of the cam ring which converts a relative rotation therebetween into an axial movement of the cam ring. A biasing device is arranged between the cam ring and the spherical members for applying a force to the spherical member caused by the axial movement of the cam ring. A cap is fit over the cam ring, the follower ring and the biasing means in such a way to rotatably couple to the cam ring and axially movably fix the follower ring so that by manually rotating the cap, a relative rotation is caused between the cam ring and the follower ring which in turn axially moves the cam ring to apply the force to the spherical members.

BRIEF DESCRIPTION OF THE DRAWINGS

The present invention will be better understood from the following description of a preferred embodiment thereof, which is illustrative and not limitative, with reference to the attached drawings, wherein.

DETAILED DESCRIPTION OF THE PREFERRED EMBODIMENTS

Figure 1:
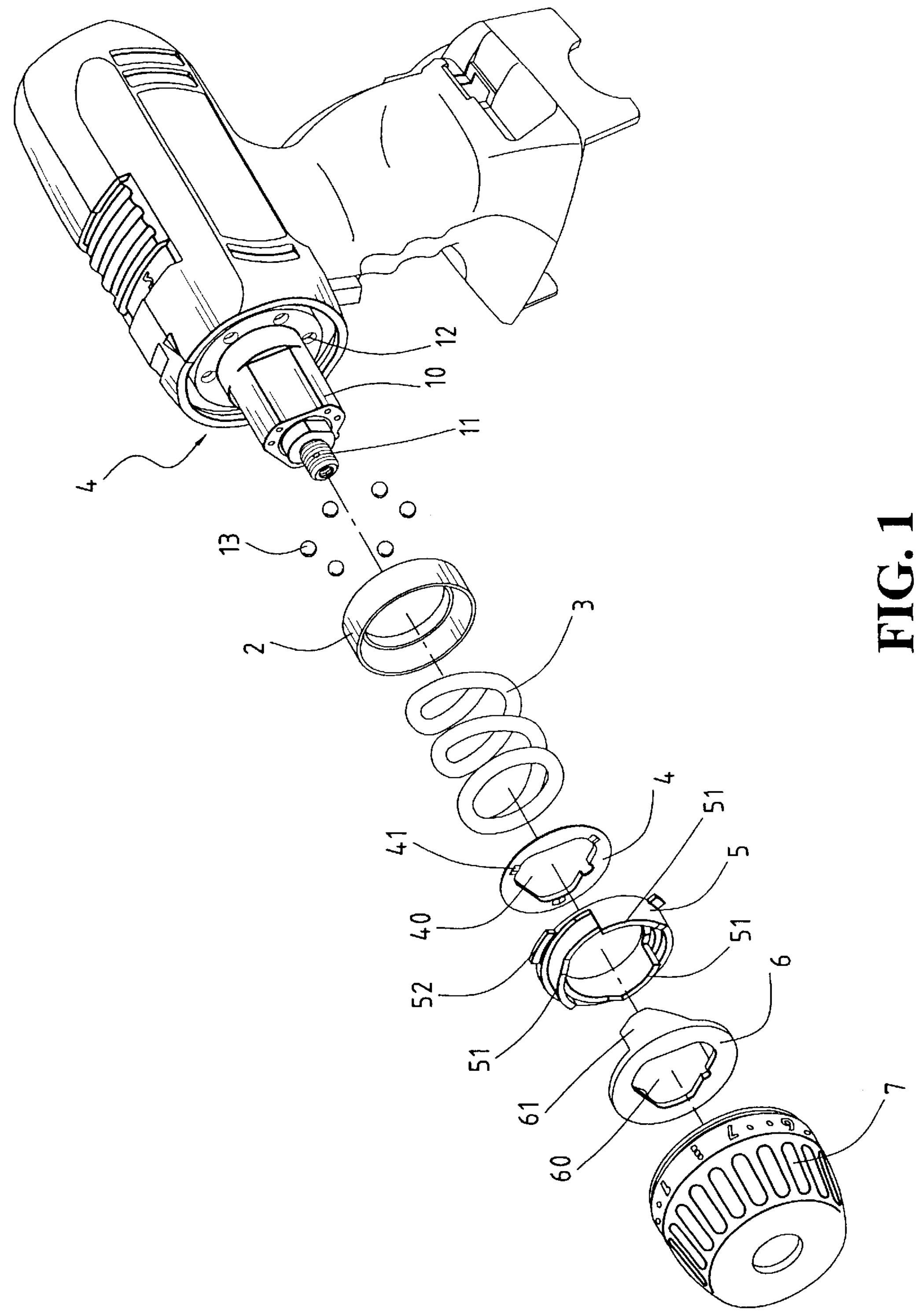
FIG. 1 is an exploded perspective view showing a torque adjusting device constructed in accordance with the present invention incorporated in a rotation tool.
Figure 2:
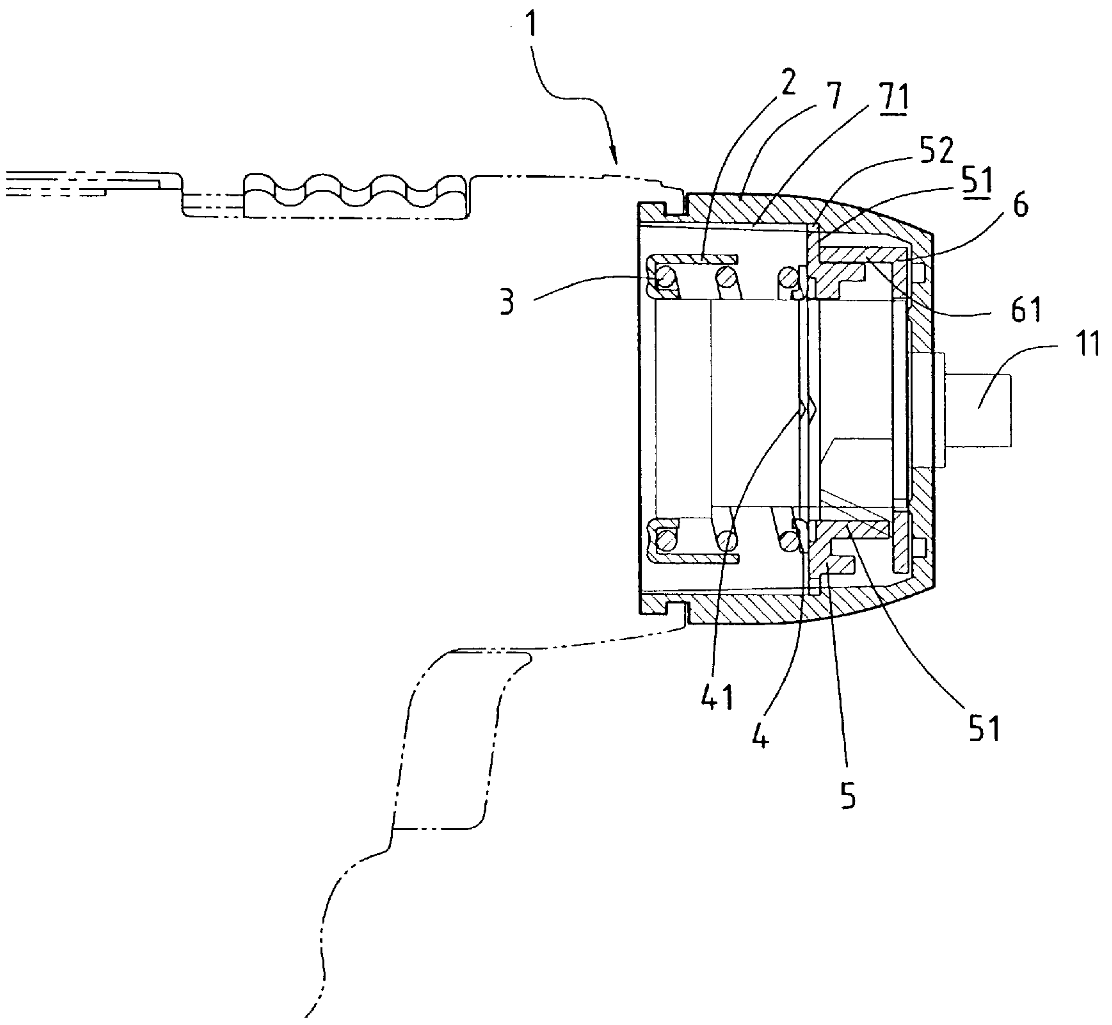
FIG. 2 is a cross-sectional view of the torque adjusting device of the present invention mounted to the rotation tool with the rotation tool shown in phantom lines.

With reference to the drawings and in particular to FIGS. 1 and 2, wherein a torque adjusting device constructed in accordance with the present invention is shown mounted to a rotation tool, generally designated at 1, the rotation tool 1 in which the torque adjusting device of the present invention is incorporated comprises a front end surface having a support cylinder 10 mounted thereon to rotatably support an output shaft 11 which is rotatable about a central axis defined by the support cylinder 10. The support cylinder 10 comprises a non-circular-sectioned free end, preferably having a polygonal cross section, such as triangular as shown in the drawings. The rotation tool 1 also comprises a plurality of circular cavities 12 provided on the front end surface and positioned around the support cylinder 10 to each receive therein a spherical member 13. The spherical members 13 are received in the cavities 12 in such a way to be in contact with a rotating disk inside the rotation tool 1 so as to apply a force thereto and the greater the force applied to the rotating disk of the rotation tool 1, the greater the torque output from the output shaft 11. This is well known to those skilled in the art so that further detail is not needed herein.

The torque adjusting device of the present invention comprises a cam ring 5 which is rotatably fit over the support cylinder 10 of the rotation tool 1 and a follower ring 6 which is non-rotatably fit over the support cylinder 10. The cam ring 5 comprises a plurality of circumferentially-extending arc-shaped projections 51 each having a center coincident with the central axis of the output shaft 11. The arc projections 51 a different radius with respect to the central axis and each has a camming surface defining a cam, see FIG. 1. The cam ring 5 also comprises a plurality of radially-extending tabs 52 to be further described.

Figure 3:
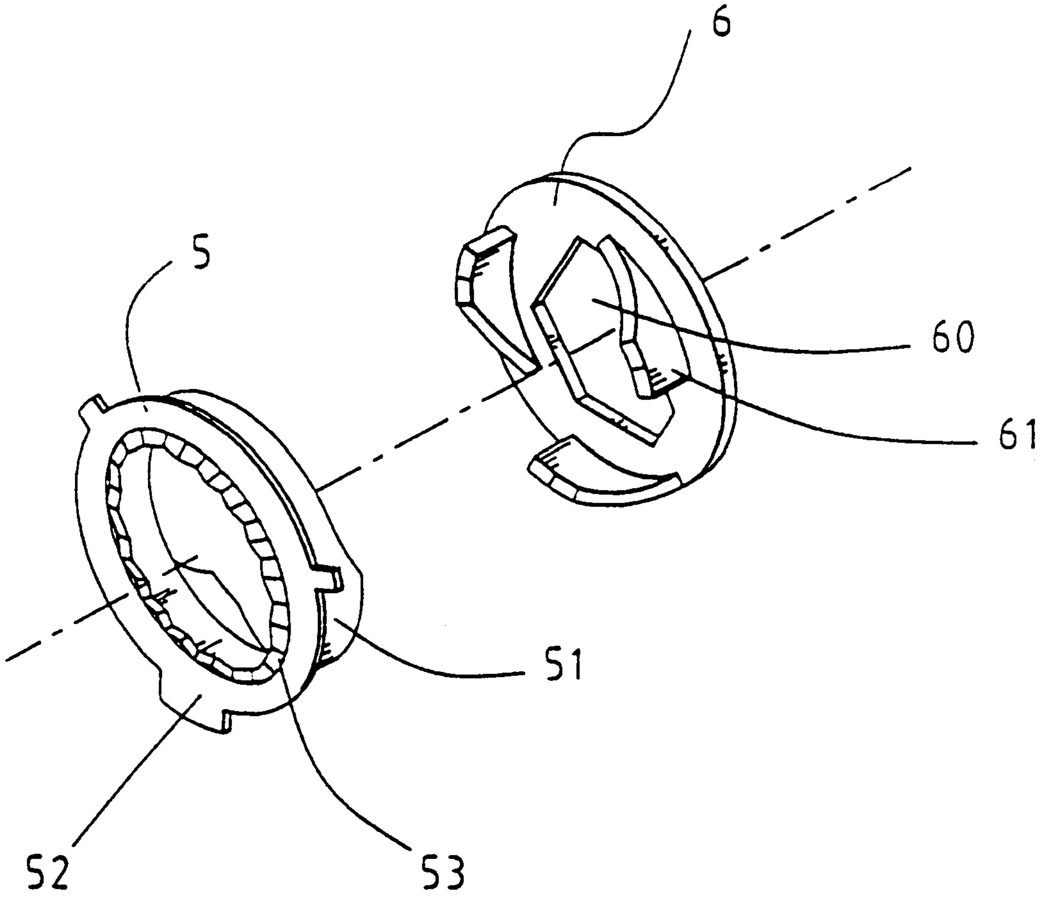
FIG. 3 is an exploded perspective view showing the cam ring and the follower ring of the torque adjusting device of the present invention.
Figure 4:
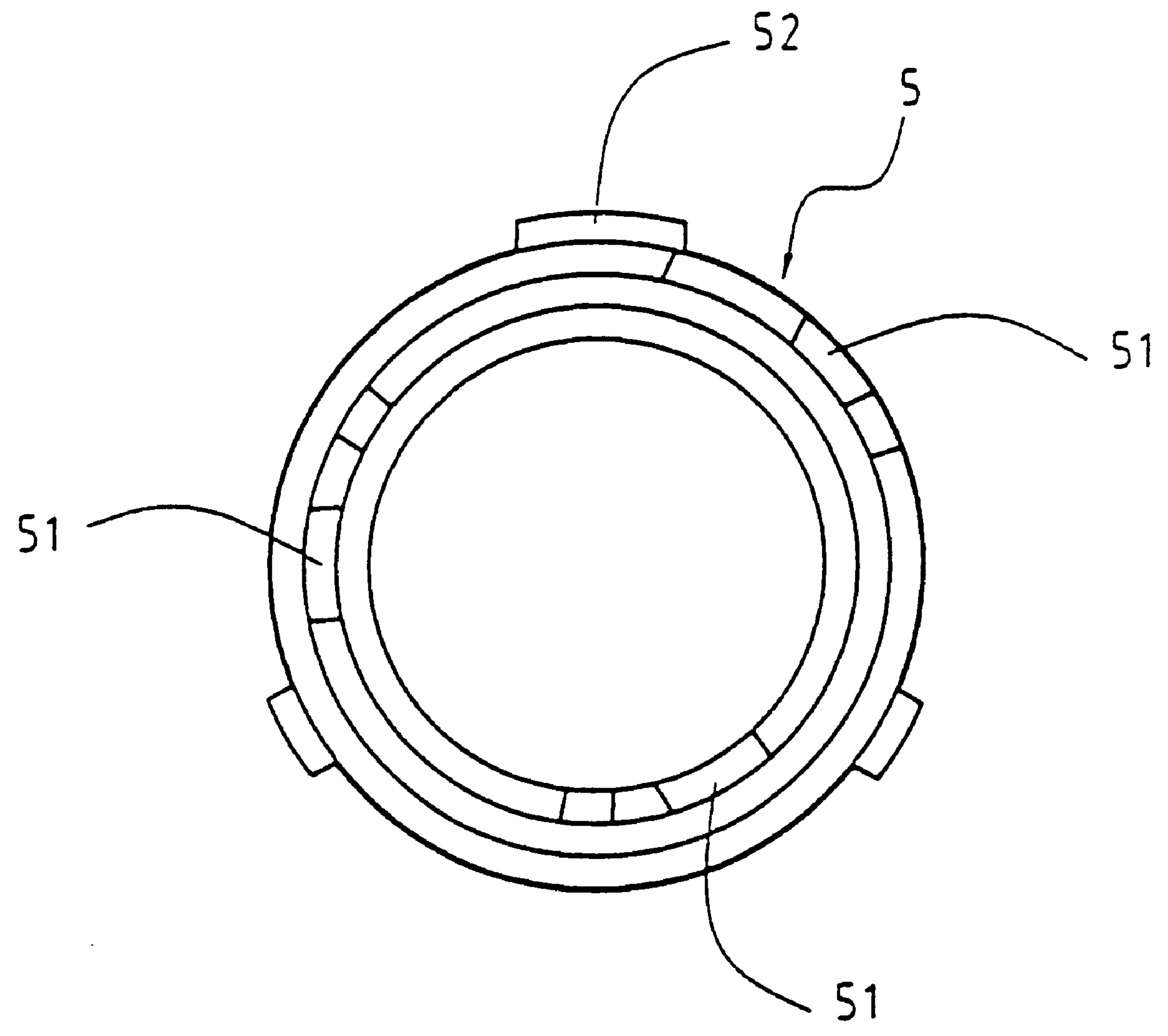
FIG. 4 is a plan view of the cam ring in accordance with the present invention.
Figure 5:
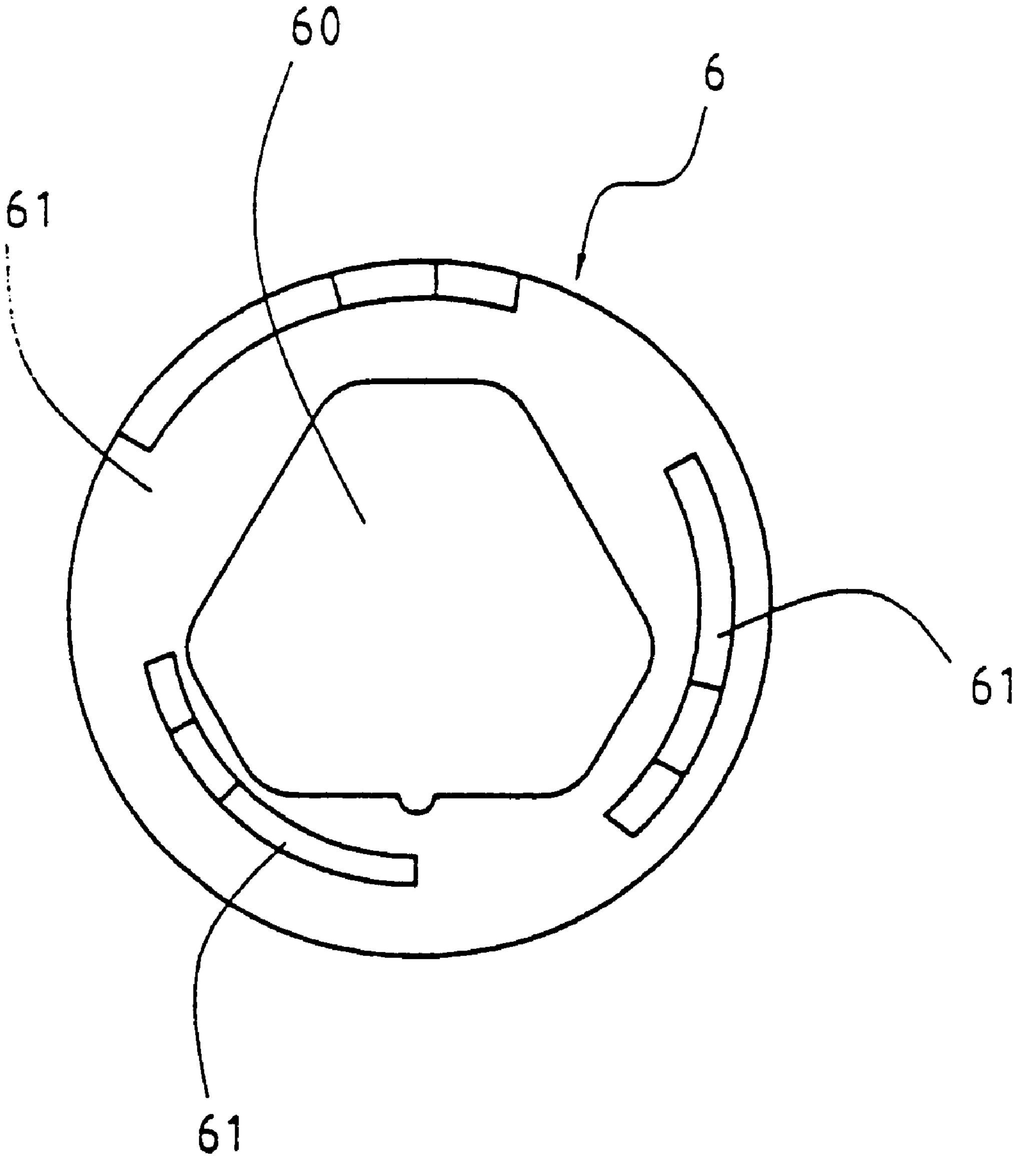
FIG. 5 is a plan view of the follower ring in accordance with the present invention.

The follower ring 6 which comprises a non-circular or polygonal central bore 60 fit over the polygonal free end section of the support cylinder 10 so as to be non-rotatable with respect thereto comprises a plurality of circumferentially-extending arc projections 61 (see FIG. 3) each having a camming surfaces defining a follower corresponding to and camming-engageable with the cam projections 51 of the cam ring 5 so that when a relative rotation occurs between the cam ring 5 and the follower ring 6, a relative axial movement is caused between the cam ring 5 and the follower ring 6. Preferably, the relative rotation of the cam ring 5 with respect to the follower ring 6 is converted into axial movement of the cam ring 5 along the support cylinder 10.

A biasing device comprises a base ring 2 fit over the support cylinder 10 to hold the spherical members 13 in the cavities 12 and a holding ring 4 having a polygonal central bore 40 fit over the polygonal free end section of the support member 10 to be non-rotatable with respect thereto. A biasing element, such as a helical spring 3 is disposed between the holding ring 4 and the base ring 2.

The cam ring 5 is fit over the support cylinder 10 in such a way to be supported by the holding ring 4. Preferably, the cam ring 5 is provided with a plurality of teeth 53, see FIG. 3, to be engageable with tooth-like projections 41 that are provided on the holding ring 4. This provides a ratchet like action between the cam ring 5 and the holding ring 4 which may provide indication and positioning purpose.

A manual rotation cap 7 having therein an interior space is fit over the support cylinder 10 and axially movably fixed to the rotation tool 1 in such a way to house the biasing device, the cam ring 5 and the follower ring 6 in the interior space thereof and axially movably fix the follower ring 6. The cap 7 has a plurality of slots 71 (see FIG. 2) therein for receiving the tabs 52 of the cam ring 5 in such a way to rotatably couple the cam ring 5 to the cap 7. Thus by manually rotating the cap 1, the cam ring 5 is rotated about the central axis of the support cylinder 10. By means of the camming engagement between the cam ring 5 and the follower ring 6, the rotation of the cam ring 5 is converted into axial movement of the cam ring 5 which in turn changes axial force acting on the spring 3 so as to cause a change of the force applied to the spherical members 13 via the base ring 2 and thus the output torque of the output shaft 11 is adjusted.

It is apparent that although the present invention is illustrated with the description of the preferred embodiment thereof, it is contemplated that there may be changes and modifications in the described embodiment that can be carried out without departing from the scope of the invention which is intended to be limited only by the appended claims. All these variation and modification should be considered within the scope of the present invention.

What is claimed:

1. A rotatable torque adjusting device adapted to be incorporated in a rotation tool for adjusting output torque of the rotation tool, wherein the rotation tool comprises a front end surface on which a support cylinder is provided to rotatably support therein an output shaft which provides the output torque, a plurality of the cavities provided on the front end surface in such a way to surround the support cylinder and each receiving therein a spherical member which applies a force to a rotating disk inside the rotation tool to adjust the output torque, the torque adjusting device comprising a cam ring rotatably fit over the support cylinder and having a plurality of circumferentially-extending arc-shaped camming projections, each defining a cam, and a follower ring non-rotatably fit over the support cylinder and having a plurality of camming projections, each defining a follower corresponding to and camming-engageable with the cam of the cam ring which converts a relative rotation between the cam ring and the follower ring into an axial movement of the cam ring along the support cylinder, biasing means being arranged between the cam ring and the spherical members for applying a force to the spherical members caused by the axial movement of the cam ring and a cap fit over the cam ring, the follower ring and the biasing means in such a way to rotatably couple to the cam ring and axially movably fix the follower ring so that by means of manual rotation of the cap, a relative rotation is caused between the cam ring and the follower ring which in turn axially moves the cam ring to apply the force to the spherical members, wherein the rotatable coupling between the cap and the cam ring comprises a plurality of radially extending tabs on the cam ring which are received in slots formed inside the cap.

2. The torque adjusting device as claimed in claim 1, wherein the support cylinder of the rotation tool comprises a non-circular-sectioned free end portion and wherein the follower ring comprises a non-circular central bore which corresponds to and is fit over the non-circular-sectioned free end portion of the support cylinder so as to be non-rotatable with respect thereto.

3. The torque adjusting device as claimed in claim 1, wherein the biasing means comprises a base ring fit over the support cylinder to be in contact engagement with the spherical members and a holding ring non-rotatably but axially movably fit over the support cylinder with a spring arranged therebetween, the cam ring being supported on the holding ring so as to transmit the axial movement of the cam ring to the spring which in turn applies the force to the spherical members.

4. The torque adjusting device as claimed in claim 3, wherein the support cylinder of the rotation tool comprises a non-circular-sectioned free end portion and wherein the holding ring of the biasing means comprises a non-circular central bore which corresponds to and is fit over the non-circular-sectioned free end portion of the support cylinder so as to be non-rotatable with respect thereto.

5. The torque adjusting device as claimed in claim 3, wherein the cam ring comprises a plurality of teeth thereon and wherein the holding ring comprises tooth-like projections selectively engageable with the teeth of the cam ring for positioning purpose.

* * * * *